United States Patent [19]

Eida

[11] Patent Number: 5,482,546

[45] Date of Patent: Jan. 9, 1996

[54] DYE, INK CONTAINING THE SAME, AND INK-JET RECORDING METHOD AND INSTRUMENT USING THE INK

[75] Inventor: Tsuyoshi Eida, Yokohama, Japan

[73] Assignee: Canon Kabushiki Kaisha, Tokyo, Japan

[21] Appl. No.: 411,964

[22] Filed: Mar. 28, 1995

[30] Foreign Application Priority Data

Mar. 30, 1994 [JP] Japan ..................... 6-082746

[51] Int. Cl.$^6$ .................................. C09D 11/02
[52] U.S. Cl. ........................ 106/22 K; 534/781
[58] Field of Search .......... 106/22 K; 534/781

[56] References Cited

U.S. PATENT DOCUMENTS

| | | | |
|---|---|---|---|
| 3,621,006 | 11/1971 | Jirou et al. | 534/781 |
| 3,801,122 | 4/1979 | Kilmurry | 534/781 |
| 4,043,752 | 8/1977 | Kilmurry et al. | 534/781 |
| 4,045,425 | 8/1977 | Hunter | 534/781 |
| 4,139,343 | 2/1979 | Steiner | 106/22 K |
| 4,200,570 | 4/1980 | Steiner | 106/22 K |
| 4,209,297 | 6/1980 | Stephan et al. | 106/22 K |
| 4,234,481 | 11/1980 | Steiner | 106/22 K |
| 4,425,162 | 1/1984 | Sugiyama et al. | 106/22 K |
| 4,557,761 | 12/1985 | Kobayashi et al. | 106/22 |
| 4,661,158 | 4/1987 | Kobayashi et al. | 106/22 |
| 4,804,411 | 2/1989 | Eida et al. | 106/22 |

(List continued on next page.)

FOREIGN PATENT DOCUMENTS

| | | | |
|---|---|---|---|
| 2347124 | 3/1974 | Germany | 534/781 |
| 37732 | 4/1978 | Japan | 435/781 |
| 55-152766 | 11/1980 | Japan. | |
| 42775 | 3/1982 | Japan | 534/781 |
| 67677 | 4/1982 | Japan | 106/22 K |
| 176267 | 10/1983 | Japan | 106/22 K |
| 67575 | 4/1985 | Japan | 106/22 K |
| 199077 | 10/1985 | Japan | 106/22 K |
| 2-5785 | 2/1990 | Japan. | |

| | | | |
|---|---|---|---|
| 5-426 | 1/1993 | Japan. | |

*Primary Examiner*—Helene Klemanski
*Attorney, Agent, or Firm*—Fitzpatrick, Cella, Harper & Scinto

[57] ABSTRACT

Disclosed herein is a dye represented by the general formula

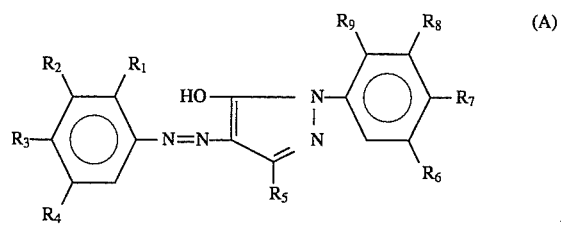

wherein $R_1$, $R_2$, $R_3$ and $R_4$ are independently a radical selected from the Group B or a radical of the formula (i) or (ii), $R_5$ is $CH_3$ or $COONH_4$, and $R_6$, $R_7$, $R_8$ and $R_9$ are independently a radical selected from the Group B or a radical of the formula (iii), with the proviso that in a molecule of the dye, the number of $SO_3NH_4$ is 1 and the number of $COONH_4$ is 2 or 3:

Group B: H, OH, $CH_3$, $C_1$, $COONH_4$ and $SO_3NH_4$;

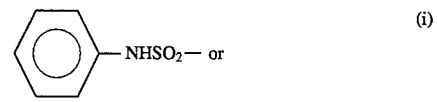

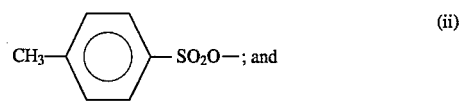

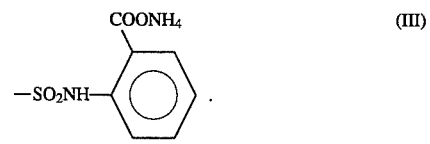

33 Claims, 3 Drawing Sheets

U.S. PATENT DOCUMENTS

| | | | |
|---|---|---|---|
| 4,864,324 | 9/1989 | Shirota et al. | 346/1.1 |
| 4,929,277 | 5/1990 | Tanaka et al. | 106/22 K |
| 5,017,227 | 5/1991 | Koike et al. | 106/22 |
| 5,082,496 | 1/1992 | Yamamoto et al. | 106/22 |
| 5,110,356 | 5/1992 | Shirota et al. | 106/22 |
| 5,123,960 | 6/1992 | Shirota et al. | 106/22 |
| 5,127,946 | 7/1992 | Eida et al. | 106/22 |
| 5,130,723 | 7/1992 | Yamamoto et al. | 346/1.1 |
| 5,135,570 | 8/1992 | Eida et al. | 106/22 |
| 5,139,573 | 8/1992 | Yamamoto et al. | 106/22 |
| 5,167,703 | 12/1992 | Eida et al. | 106/22 K |
| 5,178,671 | 1/1993 | Yamamoto et al. | 106/22 K |
| 5,213,614 | 5/1993 | Eida et al. | 106/22 K |
| 5,215,577 | 6/1993 | Eida et al. | 106/22 K |
| 5,215,578 | 6/1993 | Eida et al. | 106/22 K |
| 5,216,437 | 6/1993 | Yamamoto et al. | 346/1.1 |
| 5,231,417 | 7/1993 | Shirota et al. | 346/1.1 |
| 5,258,505 | 11/1993 | Eida et al. | 534/680 |

DYE, INK CONTAINING THE SAME, AND INK-JET RECORDING METHOD AND INSTRUMENT USING THE INK

BACKGROUND OF THE INVENTION

1. Field of the Invention

The present invention relates to a dye and an ink containing such a dye, and particularly to a dye and an ink suitable for ink-jet uses, and an ink-jet recording method using such an ink and ink-jet instruments containing the ink therein.

2. Related Background Art

In recent years, the developments of color displays in personal computers from the desktop type to the note type have been advanced. Application software for making good use of color's power of expression has been published. Therefore, color recording by printers is a promising field.

Among various recording processes used in these printers, an ink-jet recording process is a process in which droplets of an ink are formed by any of various ink-ejection systems, and they are applied to a recording medium such as plain paper, converted paper, plastic film, or a cloth to conduct recording. The process has advantages that a recording apparatus making good use of such a process is silent because a recording head makes no contact with a recording medium, printing can be conducted at high speed, and color recording can be achieved with ease.

Inks used in ink-jet recording have heretofore been required to have the following properties:

(1) providing images sufficient in optical density;

(2) providing recorded images on which feathering scarcely occurs;

(3) providing recorded images which do not run even when brought into contact with water (water fastness);

(4) providing recorded images excellent in light fastness;

(5) causing no clogging at an orifice;

(6) undergoing no change of properties even after stored for a long period of time;

(7) being high in safety upon their use; and (8) exerting no adverse influence on means for generating thermal energy in an ink-jet system making good use of thermal energy.

Inks used in an ink-jet recording process for conducting color recording are also required in addition to the above properties to have the following properties:

(9) being high in color purity in individual inks and capable of reproducing color tone faithful to the original; and

(10) even when stopping ejection of an ink of a specific color from a nozzle for a predetermined period of time to use it in a part of a print to be produced, causing no ejection failure upon resumption of the ejection.

These properties or characteristics may of course be influenced by the composition of ink, and are also greatly controlled by the nature of a dye contained as a coloring material in the ink. It is difficult to satisfy all the above performance requirements by using existing dyes.

The conventional water-based inks for ink-jet recording have principally used existing water-soluble dyes. These dyes each have a sulfonic group as a solubilizing group, and hence are highly solubile in media for water-based inks, and the long-term storability of inks containing such a dye is also generally good. However, a print obtained by making a record with such an ink on a recording medium has undergoes running of the dye and bleeding when splashed with water or touched with wet fingers, or when characters on the print are rubbed with a water-based felt pen, so that the print is often deteriorated in image quality and made illegible. In particular, this phenomenon is more marked on color inks because dyes used in the color inks are lower in affinity for paper than black dyes. This problem has been included among problems offered upon the formation of color images on plain paper.

Japanese Patent Application Laid-Open No. 55-152766 discloses an ink intended to improve solution stability, long-term storability and ejection stability using a yellow dye having a specific molecular-structure. However, the problem of water fastness as described above has not yet been fully solved even by this ink.

Japanese Patent Publication No. 5-426 discloses an ink containing a yellow dye having a specific molecular structure, the ink being intended to improve the water fastness of the resulting print by printing on specially treated paper with the ink. However, it is demonstrated by examples of the publication that this ink has no effect on commercially available plain paper.

Japanese Patent Publication No. 2-5785 discloses an ink containing C.I. Direct Yellow 86. However, the hue of this dye is somewhat reddish-yellow and hence involves a problem from the viewpoint of color reproducibility.

SUMMARY OF THE INVENTION

It is accordingly an object of the present invention to provide a dye which permits the provision of an ink capable of providing images high in optical density, bright in color tone as a yellow ink, good in color reproducibility and excellent in water fastness on various types of plain paper when contained in the ink as a coloring material, an ink containing this dye, and an ink-jet recording method and instruments using such an ink.

The above object can be achieved by the present invention described below.

According to the present invention, there is thus provided a dye represented by the general formula

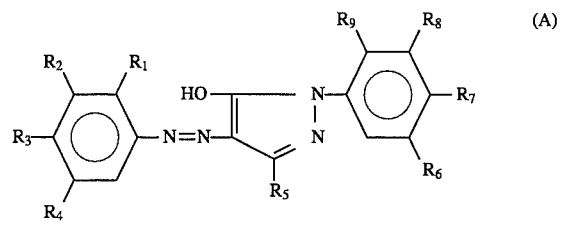

wherein $R_1$, $R_2$, $R_3$ and $R_4$ are independently a radical selected from the group consisting of H, OH, $CH_3$, Cl, $COONH_4$ and $SO_3NH_4$ or a radical of the formula

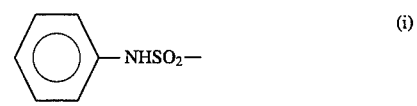

or of the formula

-continued

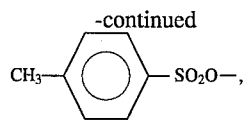 (ii)

$R_5$ is $CH_3$ or $COONH_4$, and $R_6$, $R_7$, $R_8$ and $R_9$ are independently a radical selected from the group consisting of H, OH, $CH_3$, Cl, $COONH_4$ and $SO_3NH_4$ or a radical of the formula

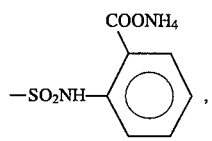 (iii)

with the proviso that in a molecule of the dye, the number of $SO_3NH_4$ radicals is 1 and the number of $COONH_4$ radicals is 2 or 3.

According to the present invention, there is also provided an ink comprising a coloring material, water, and a water-soluble organic solvent, wherein the coloring material is the dye described above.

According to the present invention, there is further provided a color ink set comprising in combination yellow, magenta and cyan inks, wherein the ink described above is used as the yellow ink.

According to the present invention, there is still further provided a color ink set comprising in combination yellow, magenta, cyan and black inks, wherein the ink described above is used as the yellow ink.

According to the present invention, there is yet still further provided an ink-jet recording method comprising applying an ink to a recording medium by an ink-jet system to conduct recording, wherein the ink described above is used as the ink.

According to the present invention, there is yet still further provided an ink-jet recording method comprising applying an ink to a recording medium by an ink-jet system to conduct recording, wherein the recording is conducted by using any one of the ink sets described above.

According to the present invention, there is yet still further provided a recording unit comprising a container portion for an ink and a head from which the ink is ejected in the form of ink droplets, wherein the ink described above is used as said ink.

According to the present invention, there is yet still further provided an ink cartridge comprising a container portion for an ink, wherein the ink described above is used as the ink.

According to the present invention, there is yet still further provided an ink-jet recording apparatus comprising the recording unit described above.

According to the present invention, there is yet still further provided an ink-jet recording apparatus comprising the ink cartridge described above.

According to the present invention, there is yet still further provided an ink-jet recording apparatus comprising any one of the ink sets described above.

DESCRIPTION OF THE PREFERRED EMBODIMENTS

Figure 1:
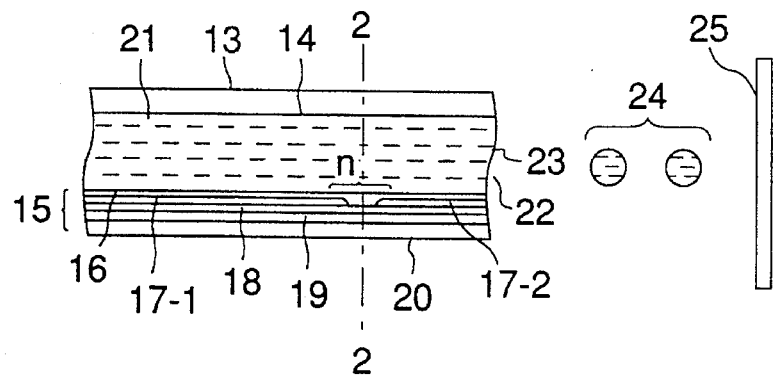
FIG. 1 is a typical cross-sectional view of a recording head according to an ink-jet recording system of the present invention.

According to the present invention, there are provided a dye which permits the provision of an ink capable of providing images high in optical density, bright in color tone as a yellow ink, good in color reproducibility and excellent in water fastness on various types of plain paper when contained in the ink as a coloring material, an ink containing this dye, and an ink-jet recording method and instruments using such an ink.

In particular, the dye according to the present invention is bright lemon yellow, and so its color reproduction range is wide. Therefore, the dye is extremely suitable for use in inks for recording full-color images including half tone.

The present invention will hereinafter be described in more detail by preferred embodiments.

The dye according to the present invention has one sulfonic group and two or three carboxyl groups in its molecule in order for the dye to have sufficient solubility in ink, and for a print obtained by recording on plain paper with an ink containing the dye to have high water fastness. In addition, these groups form salts with an ammonium ion.

As preferable specific examples of the dye according to the present invention, may be mentioned those represented by the following general formula (A) having their corresponding radicals shown in Table 1. In the following Table 1, M denotes $NH_4$, and Formulas (i), (ii) and (iii) are as described below.

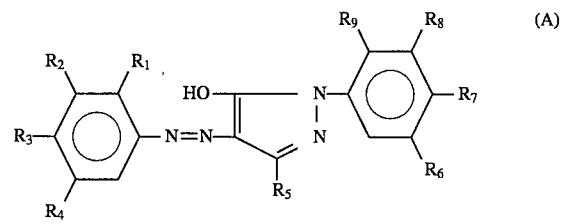 (A)

TABLE 1

|  | $R_1$ | $R_2$ | $R_3$ | $R_4$ | $R_5$ | $R_6$ | $R_7$ | $R_8$ | $R_9$ |
|---|---|---|---|---|---|---|---|---|---|
| No. 1 | H | H | COOM | H | COOM | H | $SO_3M$ | H | H |
| No. 2 | H | Form. (i) | $CH_3$ | H | COOM | $SO_3M$ | H | COOM | OH |
| No. 3 | H | COOM | H | COOM | COOM | $SO_3M$ | H | H | Cl |
| No. 4 | COOM | H | $SO_3M$ | H | COOM | H | H | Form. (iii) | H |
| No. 5 | Form. (ii) | H | H | $SO_3M$ | COOM | H | H | Form. (iii) | H |
| No. 6 | H | COOM | H | COOM | $CH_3$ | H | Cl | H | $SO_3M$ |
| No. 7 | H | H | COOM | H | COOM | Cl | $SO_3M$ | H | Cl |
| No. 8 | OH | $SO_3M$ | H | Cl | COOM | H | H | Form. (iii) | H |

(i) 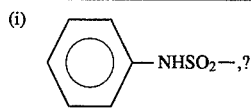

(ii) 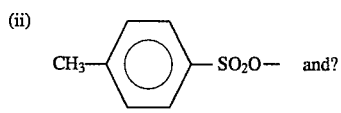 and?

(iii) 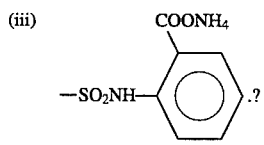

The dyes according to the present invention are synthesized by any of the processes described in Hiroshi Horiguchi, "Synthetic Dye" (published by Sankyo Shuppan K. K.), and the like.

For example, Compound No. 1 shown in Table 1 is synthesized in the following manner. Phenylhydrazine-p-sulfonic acid is suspended in water, and sodium acetate is added to the resultant suspension, followed by reaction with diethyl oxalacetate. The reaction product is hydrolyzed with an alkali to obtain 1-p-sulfophenyl-5-pyrazolone-3-carboxylic acid. This product is coupled with a diazotized product of p-aminobenzoic acid, and the resulting product is salted out with ammonium chloride to separate a dye compound. As necessary, the dye compound is subjected to ion exchange to form its ammonium salt, and purified, thereby obtaining the intended dye compound.

No particular limitation is imposed on the content of the above-described dye in the ink according to the present invention. However, it is preferably contained within a range of generally from 0.1 to 15% by weight, preferably from 0.5 to 10% by weight, more preferably from 0.5 to 6% by weight based on the total weight of the ink. The dyes according to the present invention may be used either singly or in any combination thereof.

The medium suitable for use in the ink according to the present invention is water or a mixed solvent of water and a water-soluble organic solvent. As the water, it is preferable to use deionized water instead of tap water containing various ions.

As examples of the water-soluble organic solvents used in combination with water, alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketoalcohols such as acetone and diacetone alcohol; ethers such as dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol and diethylene glycol; thiodiglycol; 1,2,6-hexanetriol; glycerol; lower alkyl ethers of polyhydric alcohols, such as ethylene glycol monomethyl ether, ethylene glycol monoethyl ether, diethylene glycol monomethyl ether, diethylene glycol monoethyl ether, triethylene glycol monomethyl ether and triethylene glycol monoethyl ether; lower dialkyl ethers of polyhydric alcohols, such as triethylene glycol dimethyl ether, triethylene glycol diethyl ether, tetraethylene glycol dimethyl ether and tetraethylene glycol diethyl ether; sulfolane; N-methyl-2-pyrrolidone; 1,3-dimethyl-2-imidazolidinone; and the like may be used.

The above-mentioned organic solvents are suitably chosen for use as the liquid medium for the ink according to the present invention. In the case of the ink according to the present invention, diethylene glycol or thiodiglycol are however preferred, in particular, for the purpose of preventing clogging of the ink.

A nitrogen-containing cyclic compound or an ether compound of a polyalkylene oxide is also preferred from the viewpoint of the improvement of optical density of images and ejection stability.

Further, a lower alcohol or surfactant may preferably be used from the viewpoint of the improvement of frequency responsiveness.

Therefore, a preferred solvent composition in the ink according to the present invention is that comprising a variety of such components as described above in addition to water.

The content of the water-soluble organic solvent(s) in the ink according to the present is within a range of generally from 2 to 80% by weight, preferably from 3 to 70% by weight, more preferably from 4 to 60% by weight based on the total weight of the ink.

The content of water used as a suitable liquid medium in the ink according to the present invention is within a range of generally from 10 to 97.5% by weight, preferably from 35% by weight to 97.5% by weight, more preferably 45% by weight to 97.5% by weight based on the total weight of the ink. If the amount of water in the ink is less than 10% by weight, a great amount of the low-volatile organic solvent left in an image formed, resulting in problems of migration of the coloring material, feathering or bleeding of the image, etc. It is hence not preferable to use water in such a small amount.

The ink according to the present invention may contain, in addition to the above components, a pH adjustor, viscosity modifier, surface tension modifier and/or the like as needed. As examples of the pH adjustor, various kinds of organic amines such as diethanolamine and triethanolamine; inorganic alkalis such as the hydroxides of alkali metals, for example, sodium hydroxide, lithium hydroxide, potassium hydroxide, etc.; and the like.

The ink according to the present invention preferably has a viscosity of 1 to 20 cP, preferably 1 to 15 cP at 25° C., a surface tension of at least 30 dyne/cm, preferably at least 40 dyne/cm, and a pH of about 6 to 10.

The ink according to the present invention is effective for use in recording methods of an ink-jet system. As a recording medium, any of general-purpose plain paper (for example, woodfree paper or, medium-quality paper and bond paper), coated paper, plastic films for OHP, may be used.

The ink of the present invention is particularly suitable for use in an ink-jet recording system of the type that an ink is ejected by the bubbling phenomenon of the ink caused by thermal energy. This recording system has a feature that the ejection of the ink becomes extremely stable, and no satellite dots generate. In this case, the thermal properties, for example, specific heat, coefficient of thermal expansion and heat conductivity, of the ink must however be controlled in some cases.

The ink according to the present invention may suitably be used, particularly, in an ink-jet recording system of the type that droplets of an ink are ejected by the action of thermal energy, thereby conducting recording. However, it goes without saying that the ink may also be used for general-purpose writing utensils.

As a preferred method and apparatus for conducting recording by using the ink according to the present invention, a method and apparatus in which thermal energy corresponding to recording signals is applied to an ink within a recording head, and ink droplets are generated in accordance with the thermal energy may be used. Such an ink-jet recording apparatus will hereinafter be described.

Figure 2:
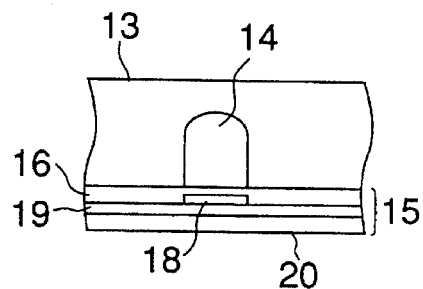
FIG. 2 is a typical cross-sectional view taken on line 2—2 in FIG. 1.

An example of the construction of a head, which is a main component of such an apparatus, is illustrated in FIGS. 1 and 2. FIG. 1 is a typical cross-sectional view of a head 13 taken along the flow path of ink, and FIG. 2 is a typical cross-sectional view taken along line 2—2 in FIG. 1. The head 13 is formed by bonding a glass, ceramic or plastic plate or the like having a groove 14 through which an ink is passed, to a heating head 15, which is used for thermal recording (the drawings show a thin-film head to which, however, is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure not illustrated. Now, upon application of electric signals to the electrodes 17-1 and 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording medium 25 in the form of recording droplets 24.

Figure 3:
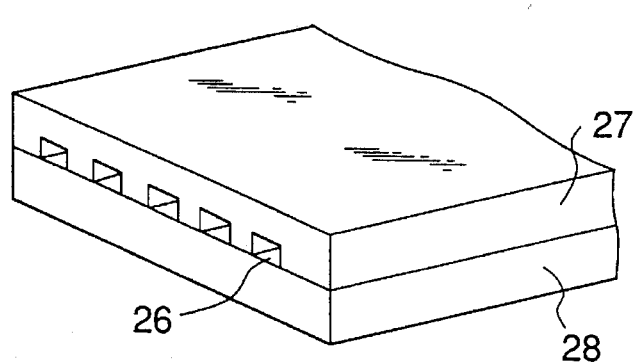
FIG. 3 is a typical perspective view of the appearance of a multi-head which is an array of such heads as shown in FIG. 1.

FIG. 3 illustrates an exemplary multi-head composed of an array of a number of heads as shown in FIG. 1. The multi-head is formed by bonding a glass plate 27 having a number of grooves 26 to a heating head 28 similar to the head as illustrated in FIG. 1.

Figure 4:
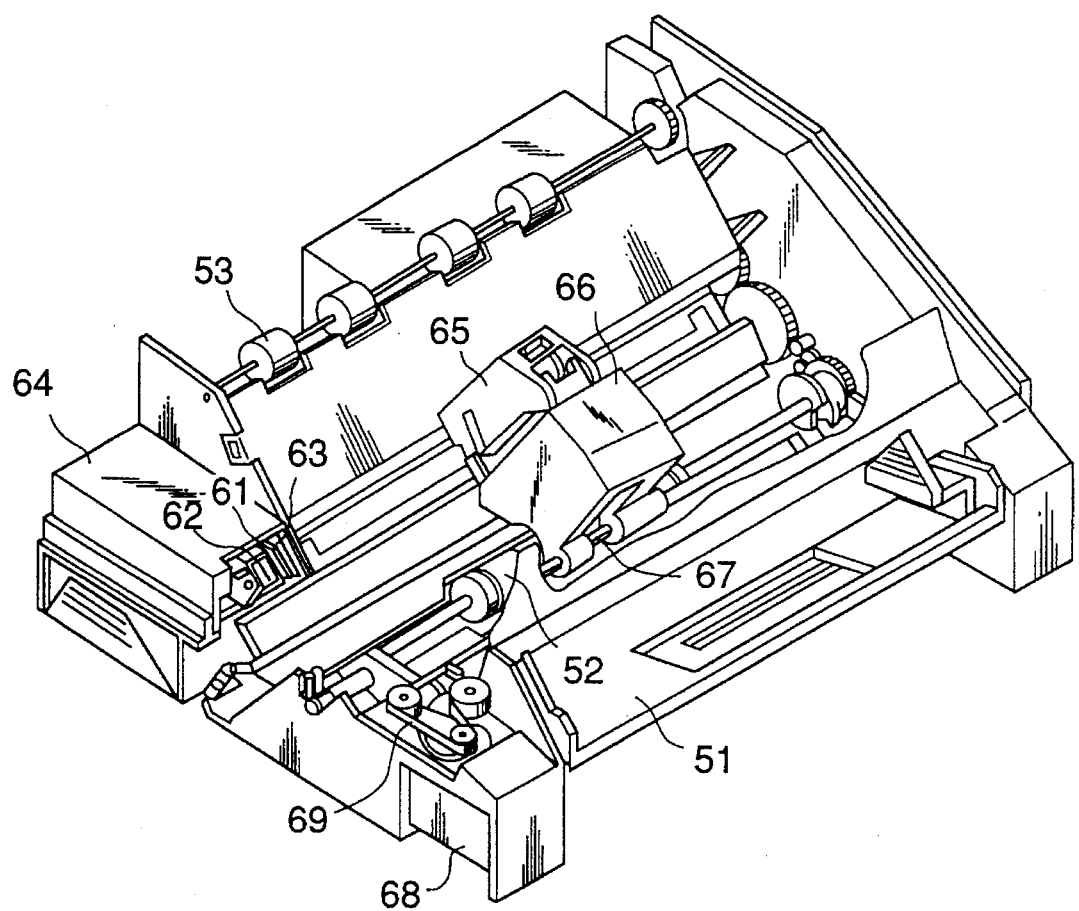
FIG. 4 is a typical perspective view of an illustrative ink-jet recording apparatus in which the head illustrated in FIG. 1 is incorporated.

FIG. 4 illustrates an exemplary ink-jet recording apparatus in which this head has been incorporated. In FIG. 4, reference numeral 65 designates the recording head having an ejection-energy-generating means and serving to eject the ink onto a recording medium set in an opposing relation with an ejection opening face provided with ejection openings to conduct recording; Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such construction, the recording medium is fed to the position opposite to the ejection opening face of the recording head 65, and discharged from a discharge section provided with discharge rollers 53 with the progress of recording.

Reference numeral 61 designates a blade serving as a wiping member, one end of which is a stationary end held by a blade-holding member to form a cantilever (not illustrated). The blade 61 is provided at a position adjacent to a region in which the recording head 65 operates, and in this embodiment, is held in such a form that it protrudes to the course through which the recording head 65 is moved. Reference numeral 62 indicates a cap for the ejection opening face of the recording head 65, which is provided at a home position adjacent to the blade 61, and is so constructed that it moves in a direction perpendicular to a direction in which the recording head 65 is moved and comes into contact with the face of the ink-ejecting openings to cap it. Reference numeral 63 denotes an ink-absorbing member provided adjoiningly to the blade 61 and, similar to the blade 61, held in such a form that it protrudes to the course through which the recording head 65 is moved. The above-described blade 61, cap 62 and absorbing member 63 constitute an ejection-recovery portion 64, where the blade 61 and absorbing member 63 remove water, dust and/or the like from the face of the ink-ejecting openings.

In the above constitution, the cap 62 in the head recovery portion 64 recedes from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head 65.

When the recording head 65 is moved from its home position to the position at which recording is started, the cap 62 and the blade 61 are at the-same positions as the positions upon the wiping as described above. As a result, the ejection opening face of the recording head 65 is also wiped at the time of this movement. The above movement of the recording head 65 to its home position is made not only when the recording is completed or the recording head is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
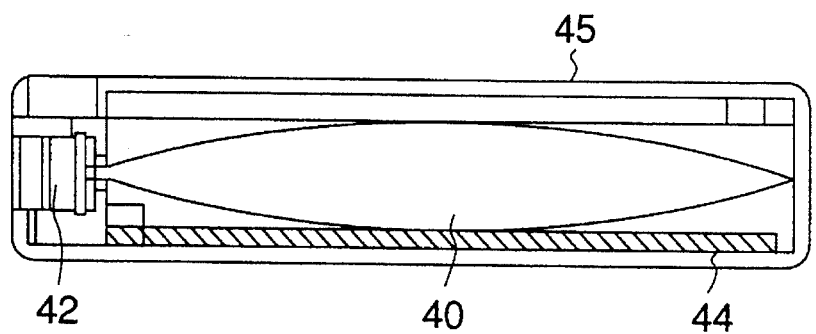
FIG. 5 is a typical cross-sectional view of an illustrative ink cartridge from which a recording liquid is fed to the head illustrated in FIG. 1.

FIG. 5 illustrates an exemplary ink cartridge 45 in which ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred in the present invention that the ink container portion is formed of a polyolefin, in particular, polyethylene, at its surface with which the ink comes into contact.

The ink-jet recording apparatus in which the ink according to the present invention is used is not limited to the apparatus as described above in which the head and the ink cartridge are separately provided. Therefore, a device in which these members are integrally formed as shown in FIG. 6 can also be preferably used.

Figure 6:
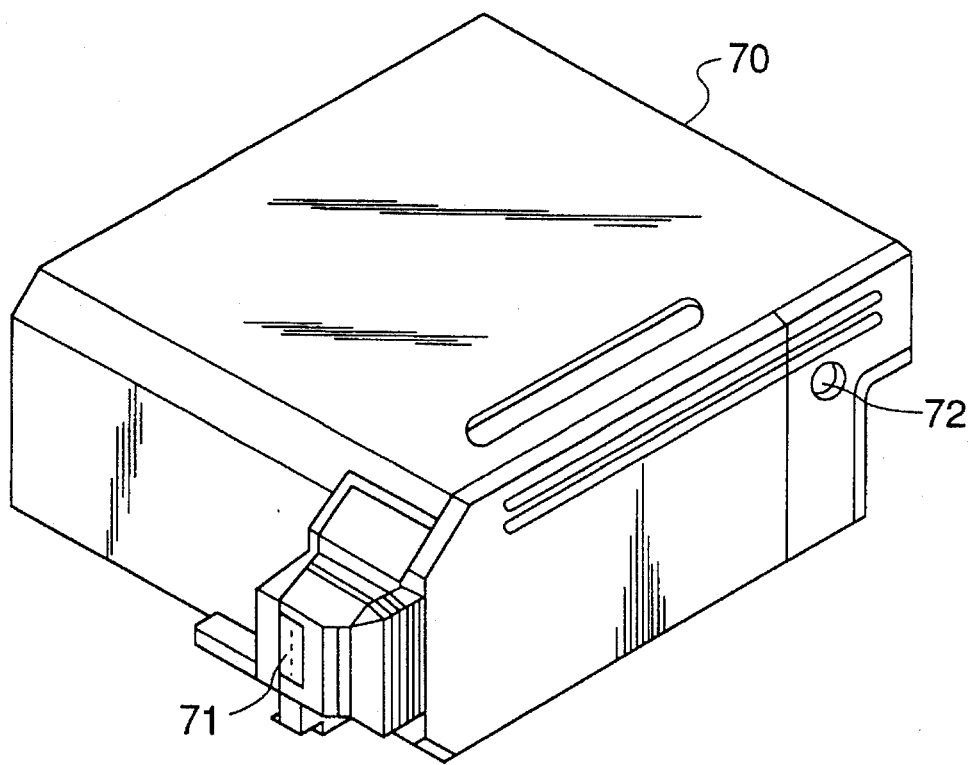
FIG. 6 is a typical perspective view illustrating principal parts of an ink-jet recording apparatus in which the head shown in FIG. 1 is formed integrally with an ink cartridge.

In FIG. 6, reference numeral 70 designates a recording unit (ink-jet cartridge), in the interior of which an ink-absorbing member impregnated with an ink is contained. The recording unit 70 is so constructed that the ink in such an ink-absorbing member is ejected in the form of ink droplets through a head 71 having a plurality of orifices. Polyurethane is preferably used as a material for the ink-absorbing member.

Reference numeral 72 indicates an air passage for communicating the interior of the ink-jet cartridge 70 with the atmosphere. This ink-jet cartridge 70 can be used in place of the recording head 65 shown in FIG. 4, and is detachably installed on the carriage 66.

The present invention will hereinafter be described more specifically by the following examples and comparative examples. Incidentally, all designations of "part" or "parts" as will be used in the following examples mean part or parts by weight unless expressly noted.

EXAMPLES 1 to 8

Preparation of Inks

Inks according to the present invention were prepared by separately using Dyes No. 1 to No. 8 according to the present invention shown in the above Table 1, mixing the individual components in accordance with their corresponding formulations shown in the following Table 2 into solutions, adjusting the resulting solutions to pH 9.0 to 9.5 with hydrochloric acid or aqueous ammonia and filtering the solutions through a filter having a pore size of 0.2 μm.

TABLE 2

| Example | Ink component | Amount used (parts) |
|---------|---------------|---------------------|
| 1 | Diethylene glycol | 10 |
|   | 2-Pyrrolidone | 5 |
|   | Ethanol | 3 |
|   | Dye No. 1 | 3 |
|   | Deionized water | 79 |
| 2 | Thiodiglycol | 10 |
|   | N-Methyl-2-pyrrolidone | 4 |
|   | 2-Propanol | 2 |
|   | Dye No. 2 | 4 |
|   | Deionized water | 80 |
| 3 | Diethylene glycol | 12 |
|   | Dimethylimidazolidinone | 3 |
|   | 1-Propanol | 5 |
|   | Dye No. 3 | 3 |
|   | Deionized water | 77 |
| 4 | Polyethylene glycol 300 | 10 |
|   | N-Methyl-2-pyrrolidone | 5 |
|   | Ethanol | 5 |
|   | Dye No. 4 | 3 |
|   | Deionized water | 77 |
| 5 | Thiodiglycol | 14 |
|   | Ethylene glycol | 6 |
|   | 1-Propanol | 4 |
|   | Dye No. 5 | 4 |
|   | Deionized water | 72 |
| 6 | Diethylene glycol | 15 |
|   | 2-Pyrrolidone | 5 |
|   | 2-Propanol | 3 |
|   | Dye No. 6 | 3 |
|   | Deionized water | 74 |
| 7 | Diethylene glycol | 10 |
|   | Polyethylene glycol | 5 |
|   | N-Methyl-2-pyrrolidone | 5 |
|   | Ethanol | 3 |
|   | Dye No. 7 | 3 |
|   | Deionized water | 74 |
| 8 | Thiodiglycol | 10 |
|   | 2-Pyrrolidone | 5 |
|   | Ethanol | 4 |
|   | Dye No. 8 | 4 |
|   | Deionized water | 77 |

COMPARATIVE EXAMPLES 1 to 5

Preparation of Inks

Inks according to Comparative Examples 1 to 5 were prepared in the same manner as in Example 1 except that Dye No. 1 was changed to any one of Dyes No. A to No. D represented by the following general formula (A) having their corresponding radicals shown in the following Table 3, and C.I. Direct Yellow 86 (Dye No. E).

Incidentally, the inks obtained by separately using Dyes No. A to No. E were regarded as inks of Comparative Examples 1 to 5 in that order.

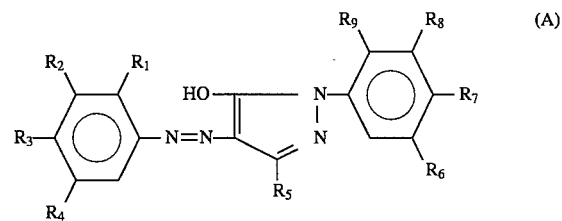

TABLE 3

|       | $R_1$   | $R_2$ | $R_3$   | $R_4$   | $R_5$  | $R_6$   | $R_7$   | $R_8$  | $R_9$ |
|-------|---------|-------|---------|---------|--------|---------|---------|--------|-------|
| No. A | $SO_3Na$ | H     | H       | $SO_3Na$ | COONa  | H       | $SO_3Na$ | H      | H     |
| No. B | $SO_3Na$ | H     | H       | $SO_3Na$ | COONa  | $SO_3Na$ | H       | COONa  | OH    |
| No. C | H       | H     | $SO_3Na$ | H       | COONa  | $SO_3Na$ | H       | COONa  | OH    |
| No. D | COONa   | H     | H       | H       | $CH_3$ | $SO_3Na$ | H       | COONa  | OH    |
| No. E | C.I. Direct Yellow 86 | | | | | | | | |

Evaluation of Inks

The inks according to Examples and Comparative Examples were separately charged in a recording apparatus equipped with an On-Demand type multi-head (orifice size: 40×40 μm, drive voltage: 32 V, frequency: 3.5 kHz) which made a record by applying thermal energy to the ink in a recording head to generate droplets of the ink, thereby conducting printing to evaluate the inks and the resulting prints in the following points. The evaluation results are given in Table 4 which will be shown subsequently.

(a) Optical Density

Printing was conducted on two kinds of plain paper for copying (Canon NP paper and Xerox 4024 paper) with all of nozzles simultaneously driven to prepare respective solid print patches. The optical densities were measured at several portions thereof to rank the optical density in terms of the average value in accordance with the following standard:

A: Not lower than 1.25;

B: Not lower than 1.20 but lower than 1.25;

C: Not lower than 1.00 but lower than 1.20; and

D: Lower than 1.00.

By the way, the optical density was measured by means of a reflection densitometer, TR-524 Model, manufactured by Macbeth Company.

(b) Percent Occurrence of Feathering

Dots were continuously printed on two kinds of plain paper for copying (Canon NP paper and Xerox 4024 paper) so as not to overlap to one another. The number of dots on which undefined or irregular feathering occurred was counted through a microscope to calculate percent occurrence of feathering in terms of the average value, thereby ranking the resistance to feathering in accordance with the following standard:

A: Lower than 5%;

B: Not lower than 5 but lower than 10%;

C: Not lower than 10 but lower than 20%; and

D: Not lower than 20%.

(c) Fixing Ability

Upon predetermined periods of time elapsed after printing English characters and numerals on two kinds of plain paper for copying (Canon NP paper and Xerox 4024 paper), the printed areas were rubbed with lens-cleaning paper to determine the average time (seconds) required until printed characters became free from blurring, thereby ranking the fixing ability in accordance with the following standard:

A: Shorter than 10 seconds;

B: Not shorter than 10 seconds but shorter than 15 seconds;

C: Not shorter than 15 seconds but shorter than 30 seconds; and

D: Not shorter than 30.

(d) Light Fastness

After exposing solid print patches prepared in the same manner as in the item (a) to indoor light for 2 months, the optical densities thereof were measured at several portions thereof to determine the degree of discoloration as the percent reduction (average value) of the optical densities after the exposure to the optical densities before the exposure, thereby ranking the light fastness in accordance with the following standard:

A: Lower than 10%;

B: Not lower than 10% but lower than 20%; and

C: Not lower than 20%.

By the way, the measuring method of the optical densities is the same as in the item (a).

(e) Water Fastness (e-1) After solid print patches prepared in the same manner as in the item (a) were gently immersed for 1 hour in tap water of 20° C. and then dried, the optical densities thereof were measured at several portions thereof to determine the percent reduction (average value) of the optical densities after the immersion to the optical densities before the immersion, thereby ranking the water fastness in accordance with the following standard:

A: Lower than 10%;

B: Not lower than 10% but lower than 15%;

C: Not lower than 15% but lower than 30%; and

D: Not lower than 30%.

By the way, the measuring method of the optical densities is the same as in the item (a).

(e-2) Print samples prepared in the same manner as in the item (c) were immersed for 3 seconds in tap water of 20° C. and then taken out at once to dry them, thereby determining the degree of staining on white portions due to running of the dye to rank the water fastness in accordance with the following standard:

A: Staining was scarcely recognized;

B: Staining was slightly recognized;

C: Staining was rather considerably recognized; and

D: Staining was very considerably recognized.

(f) Ejection Stability

English characters and numerals (60 letters×40 lines) were printed on 400 sheets of A4-sized plain paper for copying (Canon NP paper) to rank the ejection stability in accordance with the following standard:

A: Normal in ejection or printing; and

B: Partial ejection failure or irregular printing occurred.

(g) Anti-Clogging Property in Nozzle

After the printer was left to stand for 2 months at room temperature, recovery operation (sucking operation by a built-in pump) was conducted to determine the number of recovery operations required until normal printing was feasible, thereby ranking the anti-clogging property in accordance with the following standard:

A: Normal printing was feasible by conducting recovery operation at most once;

B: Normal printing was feasible by conducting recovery operation 2 to 4 times;

C: Normal printing was feasible by conducting recovery operation 5 to 10 times; and D: Normal printing was infeasible even after conducting recovery operation at least 11 times.

(h) Stability to Intermittent Ejection

When an intermittent operation consisting of continuous ejection, suspension of ejection for a predetermined period of time and resumption of continuous ejection is conducted, whether the disorder of ejecting direction occurs or not at the beginning of the resumption of ejection is determined by the length of the suspension time. Therefore, this suspension time was varied, thereby determining the stability to intermittent ejection to rank it in accordance with the following standard. Incidentally, this operation was performed under the following conditions:

Continuous ejection time before suspension: 10 seconds

Temperature: 20° C.

Humidity: 45%.

A: No disorder of ejecting direction occurred even after suspended for 45 seconds or longer;

B: No disorder of ejecting direction occurred even after suspended for 30 seconds or longer;

C: No disorder of ejecting direction occurred even after suspended for 15 seconds or longer;

D: Disorder of ejecting direction occurred in suspension time shorter than 15 seconds.

record a full-color image having half tone on Canon NP paper and Xerox 4024 Paper. As a result, extremely beautiful images good in color reproducibility were obtained.

On the other hand, a full-color image was recorded in the same manner as described above except that the ink prepared in Comparative Example 5 was used as a yellow ink. As a result, portions of the resulting image, in which the yellow ink was mixed, were considerably reddish, and color reproducibility was hence poor compared with the above case where the ink according to the present invention was used.

According to the present invention, as described above, there are provided a dye which permits the provision of an ink capable of providing images high in optical density, bright in color tone as a yellow ink, good in color reproducibility and excellent in water fastness on various types of plain paper when contained in the ink as a coloring material, an ink containing this dye, and an ink-jet recording method and instruments using such an ink.

Besides, the dye according to the present invention is bright lemon yellow, and so its color reproduction range is wide. Therefore, the dye is extremely suitable for use in inks for recording full color images including half tone.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims

TABLE 4

Evaluation results of Examples and Comparative Examples

| Evaluation item | Example | | | | | | | | Comp. Example | | | | |
| --- | --- | --- | --- | --- | --- | --- | --- | --- | --- | --- | --- | --- | --- |
| | 1 | 2 | 3 | 4 | 5 | 6 | 7 | 8 | 1 | 2 | 3 | 4 | 5 |
| (a) Optical density | A | A | B | A | B | B | A | A | B | A | A | B | A |
| (b) Percent occurrence of feathering | A | B | A | B | B | A | A | A | A | A | B | A | B |
| (c) Fixing ability | B | B | A | B | B | B | A | A | A | B | B | A | A |
| (d) Light fastness | A | A | A | A | A | A | A | A | B | A | A | A | B |
| (e) (e-1) Water fastness | A | A | A | A | A | A | A | A | D | D | C | C | B |
| (e-2) | A | A | A | A | A | A | A | A | C | C | C | C | B |
| (f) Ejection stability | A | A | A | A | A | A | A | A | A | A | A | A | A |
| (g) Anti-clogging property | B | A | A | B | B | A | B | B | A | A | B | B | B |
| (h) Stability to intermittent ejection | A | A | B | A | A | A | A | B | A | A | B | C | B |

Evaluation of Ink When Used in Recording of Full-Color Image

The ink prepared in Example 1 was used as a yellow ink, and other inks of magenta, cyan and black colors were prepared in the same manner as in Example 1 except that Dye No. 1 was changed to C.I. Acid Red 52, C.I. Direct Blue 86 and C.I. Food Black 2, respectively. These inks were charged into the above-described recording apparatus equipped with exclusive heads for the individual inks to is to be accorded to the broadest interpretation so as to encompass all such modifications and equivalent structures and functions.

What is claimed is:

1. A dye represented by the general formula

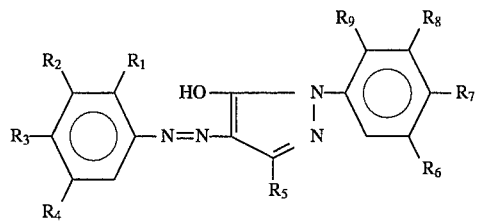

wherein $R_1$, $R_2$, $R_3$ and $R_4$ are independently a radical selected from the Group B or a radical of the formula (i) or (ii), $R_5$ is $CH_3$ or $COONH_4$, and $R_6$, $R_7$, $R_8$ and $R_9$ are independently a radical selected from the Group B or a radical of the formula (iii), with the proviso that in a molecule of the dye, the number of $SO_3NH_4$ radicals is 1 and the number of $COONH_4$ radicals is 2 or 3:

Group B: H, OH, $CH_3$, Cl, $COONH_4$ and $SO_3NH_4$;

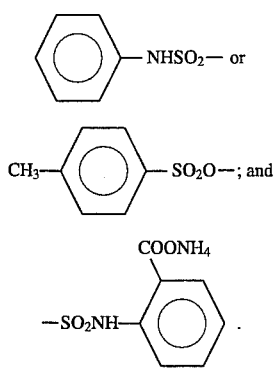

2. The dye according to claim 1, wherein in the general formula (A), $R_1$ is a radical selected from the group consisting of H, OH and $COONH_4$ or a radical of the formula

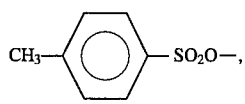

$R_2$ is a radical selected from the group consisting of H, $COONH_4$ and $SO_3NH_4$ or a radical of the formula

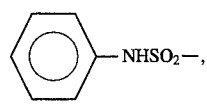

$R_3$ is a radical selected from the group consisting of H, $CH_3$, $COONH_4$ and $SO_3NH_4$, $R_4$ is a radical selected from the group consisting of H, Cl, $COONH_4$ and $SO_3NH_4$, $R_6$ and $R_7$ are independently a radical selected from the group consisting of H, Cl and $SO_3NH_4$, $R_8$ is a radical selected from the group consisting of H and $COONH_4$ or a radical of the formula

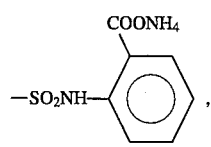

and $R_9$ is a radical selected from the group consisting of H, OH, Cl and $SO_3NH_4$.

3. An ink comprising a coloring material, water and a water-soluble organic solvent, wherein the coloring material is the dye according to claim 1.

4. An ink comprising a coloring material, water and a water-soluble organic solvent, wherein the coloring material is the dye according to claim 2.

5. The ink according to claim 3, wherein the coloring material is contained within a range of from 0.1 to 15% by weight based on the total weight of the ink.

6. The ink according to claim 4, wherein the coloring material is contained within a range of from 0.1 to 15% by weight based on the total weight of the ink.

7. The ink according to claim 3, wherein the water is contained within a range of from 10 to 97.5% by weight based on the total weight of the ink.

8. The ink according to claim 4, wherein the water is contained within a range of from 10 to 97.5% by weight based on the total weight of the ink.

9. The ink according to claim 3, wherein the solvent is contained within a range of from 2 to 80% by weight based on the total weight of the ink.

10. The ink according to claim 4, wherein the solvent is contained within a range of from 2 to 80% by weight based on the total weight of the ink.

11. The ink according to claim 3, wherein the ink has a viscosity ranging from 1 to 20 cP as measured at 25° C.

12. The ink according to claim 4, wherein the ink has a viscosity ranging from 1 to 20 cP as measured at 25° C.

13. The ink according to claim 3, wherein the ink has a surface tension of at least 30 dyne/at 25° C. cm.

14. The ink according to claim 4, wherein the ink has a surface tension of at least 30 dyne/at 25° C. cm.

15. The ink according to claim 3, wherein the ink has a pH value ranging from 6 to 10.

16. The ink according to claim 4, wherein the ink has a pH value ranging from 6 to 10.

17. A color ink set comprising in combination yellow, magenta and cyan inks, wherein the ink according to claim 3 or 4 is used as the yellow ink.

18. A color ink set comprising in combination yellow, magenta, cyan and black inks, wherein the ink according to claim 3 or 4 is used as the yellow ink.

19. An ink-jet recording method comprising applying an ink to a recording medium by an ink-jet system to conduct recording, wherein the ink according to any one of claims 3 to 16 is used as said ink.

20. The ink-jet recording method according to claim 19, wherein the ink-jet system is a system in which thermal energy is applied to the ink to generate ink droplets.

21. An ink-jet recording method comprising applying an ink to a recording medium by an ink-jet system to conduct recording, wherein the recording is conducted by using the ink set according to claim 17.

22. An ink-jet recording method comprising applying an ink to a recording medium by an ink-jet system to conduct recording, wherein the recording is conducted by using the ink set according to claim 18.

23. The ink-jet recording method according to claim 21 or 22, wherein the ink-jet system is a system in which thermal energy is applied to the ink to generate ink droplets.

24. A recording unit comprising a container portion for an ink and a head from which the ink is ejected in the form of ink droplets, wherein the ink according to any one of claims 3 to 16 is used as said ink.

25. The recording unit according to claim 24, wherein an ink-jet system, in which thermal energy is applied to the ink to generate ink droplets, is applied to the head.

26. An ink cartridge comprising a container portion for an ink, wherein the ink according to any one of claims 3 to 16 is used as said ink.

27. An ink-jet recording apparatus comprising the recording unit according to claim 24.

28. An ink-jet recording apparatus comprising the recording unit according to claim 25.

29. An ink-jet recording apparatus comprising the ink cartridge according to claim 26.

30. The ink-jet recording apparatus according to claim 29, further comprising a head which generates ink droplets by an ink-jet system.

31. An ink-jet recording apparatus comprising the ink set according to claim 17.

32. An ink-jet recording apparatus comprising the ink set according to claim 18.

33. The ink-jet recording apparatus according to claim 31, further comprising a head which generates ink droplets by an ink-jet system.

* * * * *

UNITED STATES PATENT AND TRADEMARK OFFICE
CERTIFICATE OF CORRECTION

PATENT NO. : 5,482,546
DATED : January 9, 1996
INVENTOR(S) : TSUYOSHI EIDA

It is certified that error appears in the above-indentified patent and that said Letters Patent is hereby corrected as shown below:

ON THE TITLE PAGE:

Item [57] ABSTRACT

Line 10, "$C_1$," should read --Cl,--.
Formula (iii), "(III)" should read --(iii)--.

COLUMN 1

Line 58, "a" (both occurrences) should read --the--.

COLUMN 2

Line 1, "has" should be deleted.

COLUMN 5

Line 17, ",?" should read --,--.
Line 22, "and?" should read --and--.
Line 27, ".?" should read --.--.

COLUMN 7

Line 12, "left" should read --is left--.
Line 23, "like." should read --like may be used.--.
Line 33, "paper," should read --paper, or--; and "OHP," should read --OHP, etc.--.

UNITED STATES PATENT AND TRADEMARK OFFICE
CERTIFICATE OF CORRECTION

PATENT NO. : 5,482,546

DATED : January 9, 1996

INVENTOR(S) : TSUYOSHI EIDA

It is certified that error appears in the above-indentified patent and that said Letters Patent is hereby corrected as shown below:

<u>COLUMN 8</u>

Line 25, "recording;" should read --recording.--.
    Line 57, "cap 62" should read --cap 62,--.
    Line 61, "constitution," should read --construction,--.

<u>COLUMN 9</u>

Line 7, "the-same" should read --the same--.

<u>COLUMN 15</u>

Line 31, "(III)" should read --(iii)--.

<u>COLUMN 16</u>

Line 34, "30 dyne/at 25° C. cm." should read
        --30 dyne/cm at 25° C.--.
    Line 36, "30 dyne/at 25° C. cm." should read
        --30 dyne/cm at 25° C.--.

Signed and Sealed this

Eleventh Day of June, 1996

Attest:

BRUCE LEHMAN

*Attesting Officer*        *Commissioner of Patents and Trademarks*